(12) United States Patent
Kanazawa et al.

(10) Patent No.: US 12,007,299 B2
(45) Date of Patent: Jun. 11, 2024

(54) REUSABILITY DETERMINATION METHOD FOR GEAR AND REUSABILITY DETERMINATION SYSTEM FOR GEAR

(71) Applicant: Hitachi Construction Machinery Co., Ltd., Tokyo (JP)

(72) Inventors: Tomohisa Kanazawa, Tsukubamirai (JP); Mitsuhiro Yoshimoto, Ibaraki-machi (JP); Norihito Hata, Tsuchiura (JP); Masao Hayakawa, Tsuchiura (JP); Susumu Meguro, Tsukuba (JP); Takanobu Hiroto, Ishioka (JP); Yoshitaka Matsushita, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 315 days.

(21) Appl. No.: 17/640,402

(22) PCT Filed: Dec. 17, 2020

(86) PCT No.: PCT/JP2020/047118
§ 371 (c)(1),
(2) Date: Mar. 4, 2022

(87) PCT Pub. No.: WO2021/132007
PCT Pub. Date: Jul. 1, 2021

(65) Prior Publication Data
US 2022/0326114 A1    Oct. 13, 2022

(30) Foreign Application Priority Data

Dec. 24, 2019  (JP) ................................ 2019-233454

(51) Int. Cl.
*G01M 13/021*    (2019.01)

(52) U.S. Cl.
CPC ................................ *G01M 13/021* (2013.01)

(58) Field of Classification Search
CPC ........................... G01M 13/021; F16H 61/061
See application file for complete search history.

(56) References Cited

U.S. PATENT DOCUMENTS 6,964,202 B2 * 11/2005 Buttle .................... G01N 19/08
73/799
2011/0241661 A1  10/2011 Nomura et al.
(Continued)

FOREIGN PATENT DOCUMENTS

JP    7-92140 A      4/1995
JP    2000-304710 A  11/2000
(Continued)

OTHER PUBLICATIONS

International Search Report (PCT/ISA/210) issued in PCT Application No. PCT/JP2020/047118 dated Mar. 9, 2021 with English translation (four (4) pages).
(Continued)

*Primary Examiner* — Octavia Davis Hollington
(74) *Attorney, Agent, or Firm* — Crowell & Moring LLP (57) ABSTRACT

Provided is a reusability determination method for a gear that makes it possible to determine reusability of a gear during or after use to increase the reuse ratio. The reusability determination method for a gear of the present invention includes a step of measuring a content of retained γ phases in the gear, a step of calculating a change rate of the content of the retained γ phases, a step of measuring residual stress applied to the gear, a residual stress ratio calculation step of calculating a residual stress ratio to residual stress in an initial state of the gear, and a reusability determination step of determining whether or not the gear is reusable on the basis of results of the calculation in the retained γ phase change rate calculation step and the residual stress ratio
(Continued)

calculation step. In the reusability determination step, it is determined that the gear is reusable where the state of the gear corresponds to a first phase $P_1$ or a second phase $P_2$ from among the first phase $P_1$, the second phase $P_2$, and a third phase $P_3$, and it is determined that the gear is not reusable where the state of the gear corresponds to the third phase $P_3$.

3 Claims, 8 Drawing Sheets

(56) References Cited

U.S. PATENT DOCUMENTS

| | | | | |
|---|---|---|---|---|
| 2018/0188209 | A1* | 7/2018 | Makino | G01N 27/025 |
| 2020/0123985 | A1* | 4/2020 | Lück | F02K 3/06 |
| 2023/0313875 | A1* | 10/2023 | Tanila | G01M 13/025 |
| | | | | 701/22 |

FOREIGN PATENT DOCUMENTS

| | | |
|---|---|---|
| JP | 2005-17188 A | 1/2005 |
| JP | 2012-122993 A | 6/2012 |
| JP | 2018-40771 A | 3/2018 |
| JP | 2019-20249 A | 2/2019 |
| JP | 2019-207157 A | 12/2019 |
| WO | WO 2011/074654 A1 | 6/2011 |

OTHER PUBLICATIONS

Japanese-language Written Opinion (PCT/ISA/237) issued in PCT Application No. PCT/JP2020/047118 dated Mar. 9, 2021 (three (3) pages).

International Preliminary Report on Patentability (PCT/IB/338 & PCT/IB/373) issued in PCT Application No. PCT/JP2020/047118 dated Jul. 7, 2022, including English translation of document C2 (Japanese-language Written Opinion (PCT/ISA/237) filed on Mar. 4, 2022) (five (5) pages).

* cited by examiner

REUSABILITY DETERMINATION METHOD FOR GEAR AND REUSABILITY DETERMINATION SYSTEM FOR GEAR

TECHNICAL FIELD

The present invention relates to a reusability determination method for a gear and a reusability determination system for a gear.

BACKGROUND ART

Gear parts that compose a speed reducer or the like are expensive and are frequently used in an environment in which it is difficult to acquire them. Therefore, it is required to take out gear parts from a speed reducer after it has operated for a fixed period of time and make predetermined evaluation on them and then reuse those gear parts that are found as sound. In a process at present, only gear parts on which the load is comparatively low are subjected to visual confirmation by a worker about whether or not exfoliation appears on the tooth surface thereof, and determination of whether or not they are reusable is made. Thus, approximately one half of the gear parts do not suffer from exfoliation of tooth surface and are reused. Gear parts on which the load is high are discarded uniformly at the stage where a predetermined operating time period passes.

Patent Document 1 discloses a method of estimating the remaining life from a half width of an observed peak obtained using an X-ray diffraction method. Patent Document 2 discloses a method of diagnosing the life of a bearing part in accordance with a remaining life evaluation formula utilizing a change in residual stress. Patent Document 3 discloses a method of evaluating a change amount in each retained γ phase, half width, and surface roughness in regard to fatigue damage to a bearing part to estimate its remaining life. Patent Document 4 discloses a method of measuring a change amount in retained γ phase by eddy current flaw detection.

PRIOR ART DOCUMENT

Patent Documents

Patent Document 1: JP-2019-20249-A
Patent Document 2: JP-2018-40771-A
Patent Document 3: WO 2011/074654 A1
Patent Document 4: JP-2012-122993-A

SUMMARY OF THE INVENTION

Problem to be Solved by the Invention

Gear parts that are used at high load for a predetermined period of time are all scrapped (discarded) even if they are in a sound state free from exfoliation of tooth surface. A low reuse rate of gear parts leads to increase in cost in a reproduction process at a construction or mine site. Therefore, establishment of a reasonable reusability determination criterion based on scientific evidence for ensuring the quality is required for improvement in reuse rate.

The present invention has been made in view of such a situation as described above and it is an object of the present invention to provide a reusability determination method for a gear and a reusability determination system for a gear that make it possible to determine reusability of a gear during or after use thereby to increase the reuse ratio.

Means for Solving the Problem

The inventor of the present invention has made it clear, by quantitatively measuring a change in surface layer structure of gears, that a difference is present in structure between a gear that is reusable and another gear that is not reusable. Specifically, the ratio of the retained γ phase was measured adopting an X-ray diffraction method as a non-destructive method for a gear. As a result, it has been found out that, in a surface layer structure of a gear, the retained γ phase is decreased due to the load thereon during operation. It is considered that the decrease in the retained γ phase is caused by process-induced martensite transformation. Further, since volume expansion is caused by transformation from the retained γ phase into the martensite phase, it is predicted that the residual stress changes. Therefore, as a result of the measurement of the residual stress using the X-ray diffraction method, it has been found out that the absolute value of the residual stress after operation increases from that before operation. Furthermore, focusing on the correlation between the decrease rate of the retained γ phase and the increase rate of the residual stress ratio, it has been found out that reusability determination of a gear can be performed on the basis of the correlation. The present invention provides the following means.

(1) The reusability determination method for a gear according to an embodiment of the present invention is a reusability determination method for a gear during or after use, including: a retained γ phase measurement step of measuring a content of retained γ phases in the gear; a retained γ phase change rate calculation step of calculating a change rate of the content of the retained γ phases; a residual stress measurement step of measuring residual stress applied to the gear; a residual stress ratio calculation step of calculating the residual stress ratio; and a reusability determination step of determining whether or not the gear is reusable on the basis of results of the calculation in the retained γ phase change rate calculation step and the residual stress ratio calculation step, in which, in the reusability determination step, it is determined that the gear is reusable where a state of the gear corresponds to a first phase or a second phase, from among the first phase in which a change rate of the residual stress increases as the change rate of the content of the retained γ phases decreases with reference to a state of the gear at the time of start of use, the second phase in which, after the first phase, the change rate of the residual stress increases steeply from that in the first phase as the change rate of the content of the retained γ phase decreases, and a third phase in which, after the second phase, the change rate of the residual stress decreases intermittently with respect to that in the second phase, and it is determined that the gear is not reusable where the state of the gear corresponds to the third phase.

(2) The reusability determination system according to an embodiment of the present invention is a reusability determination system for a gear during or after use, including: a measuring apparatus including a retained γ phase measurement section that measures a content of retained γ phases in the gear and a residual stress measurement section that measures residual stress applied to the gear; and a determination apparatus including a retained γ phase change rate calculation section that calculates a change rate of the content of the retained γ phases, a residual stress ratio calculation section that calculates the residual stress ratio, and a determination section that determines whether the gear is reusable or is not reusable, in which the determination section determines, on the basis of results of the calculation in the retained γ phase change rate calculation section and the residual stress ratio calculation section, a state of the gear corresponds to which one of a first phase, a second phase, and a third phase, the first phase being a phase in which the change rate of the content of the retained γ phases decreases as a change rate of the residual stress increases with reference to a state of the gear at the time of start of use; the second phase being a phase in which, after the first phase, the change rate of the residual stress increases steeply from that in the first phase as the change rate of the content of the retained γ phase decreases; and the third phase being a phase in which, after the second phase, the change rate of the residual stress decreases intermittently with respect to that in the second phase.

(3) In the reusability determination system for a gear according to (2) above, the determination apparatus may further include a database in which known data relating to a correlation between the content of the retained γ phase and the residual stress are stored.

Advantages of the Invention

According to the present invention, reusability of a gear can be determined reasonably from the reference point for reusability determination that is derived from the correlation between the decrease rate of the retained γ phase and the increase rate of the residual stress ratio. Further, according to the present invention, determination of reusability by non-destructive inspection can be implemented. As a result, it becomes possible to perform reusability determination simply and objectively for a gear also including full scrap gear parts for which even visual inspection has not been carried out so far. Consequently, it is possible to construct a quality control technology having high reliability, reduce the scrap rate significantly, and reduce the part cost.

MODES FOR CARRYING OUT THE INVENTION

In the following, a reusability determination method for a gear and a reusability determination system for a gear according to embodiments to which the present invention is applied are described in detail with reference to the drawings. It is to be noted that, in some figure referred to in the following description, in order to facilitate recognition of a characteristic, a portion that indicates the characteristic is sometimes depicted in an enlarged scale for the convenience of illustration, and a dimensional ratio of components and so forth may not be the same as actual ones. Further, materials, dimensions, and so forth exemplified in the following description are exemplary, and the present invention is not limited to them and can be carried out in a suitable modified form without changing the subject matter of it.

First Embodiment

Figure 1:
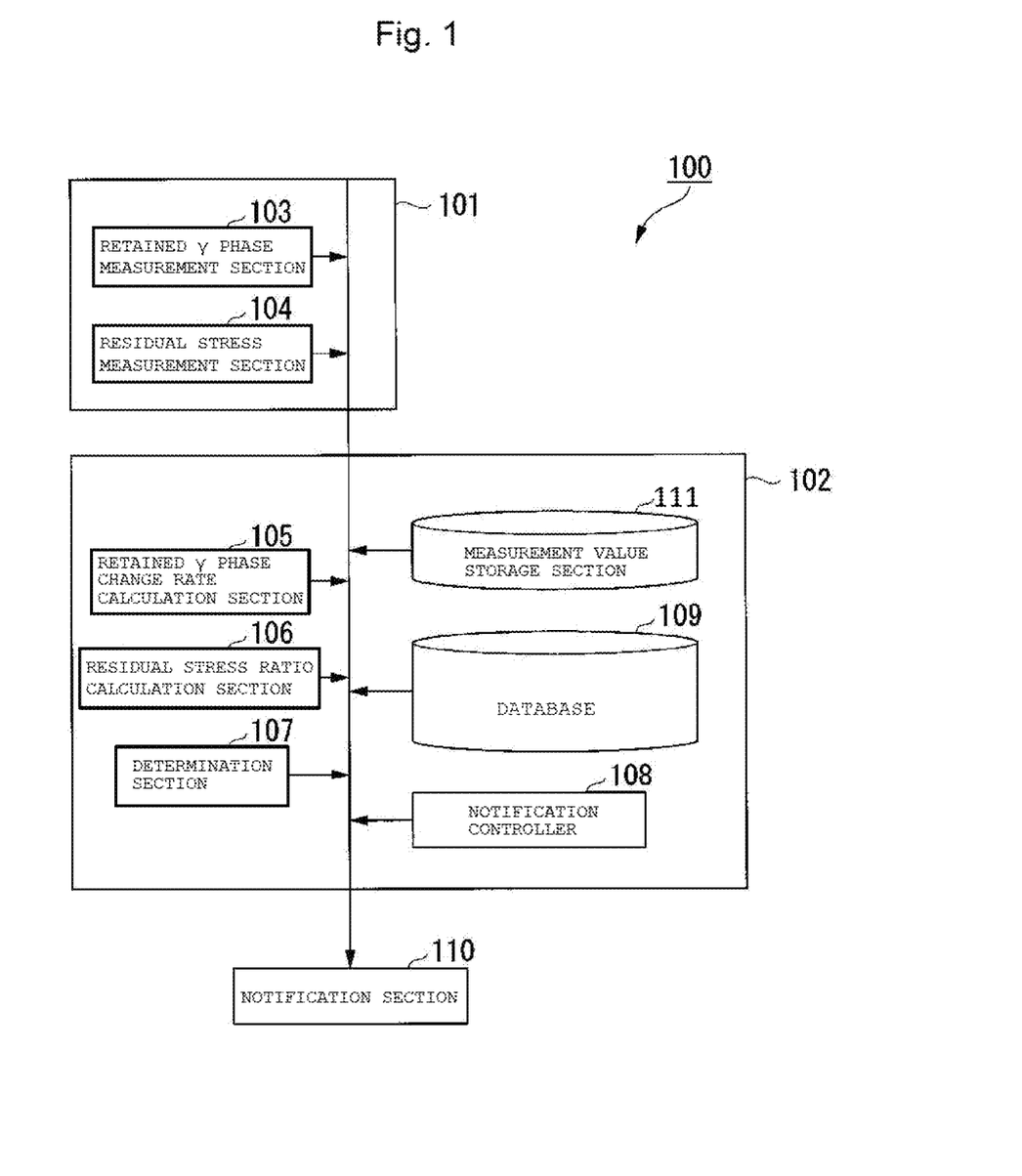
FIG. 1 is a view schematically depicting a configuration of a reusability determination system for a gear according to an embodiment of the present invention.

FIG. 1 is a view schematically depicting a configuration of a reusability determination system 100 for a gear according to a first embodiment of the present invention. The reusability determination system 100 for a gear is a reusability determination system for a gear during or after use, and includes a measuring apparatus 101 and a determination apparatus 102 as principal components thereof. The measuring apparatus 101 includes a retained γ phase measurement section 103 and a residual stress measurement section 104 as principal components thereof. The determination apparatus 102 includes a retained γ phase change rate calculation section 105, a residual stress ratio calculation section 106, and a determination section 107 as principal components thereof.

The retained γ phase measurement section 103 is a measuring device that measures the content of the retained γ (austenite) phase (face-centered cubic lattice) in a gear. The retained γ phase is a carburized tempered martensite structure and is considered to contribute to toughening. The unit area of the retained γ phase in the entire specimen is approximately 0.005 to 50 μm$^2$, and the retained γ phase existence ratio in the specimen is 35 mass % or less. The content of the retained γ phase is evaluated, for example, by performing X-ray diffraction measurement for a region of a maximum stress range of a gear and calculating the abundance ratio (unit: mass %) from a peak strength ratio between phases.

Figure 2A:
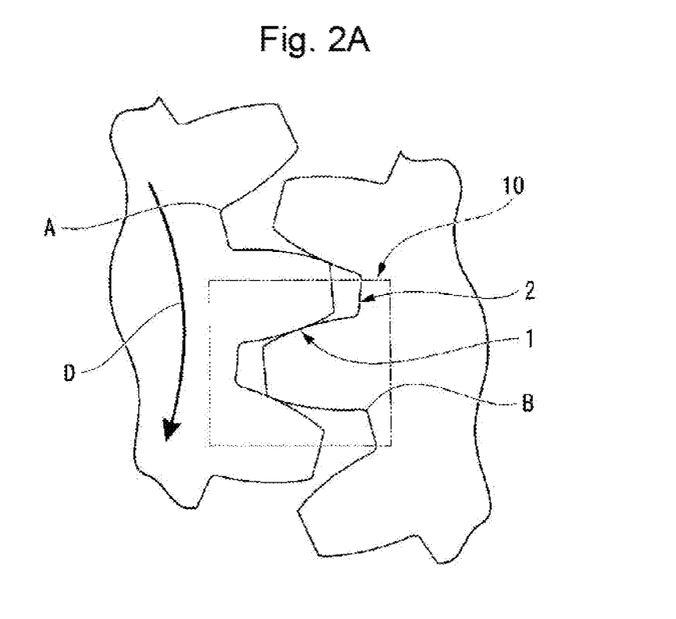
FIG. 2A is a view depicting a state in which two gears according to the embodiment of the present invention rotate while meshing with each other.
Figure 2B:
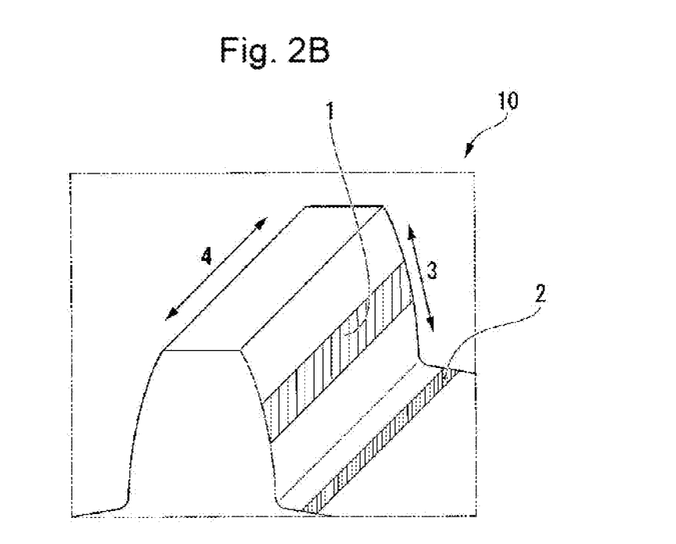
FIG. 2B is a view depicting part of the gear of FIG. 2A in an enlarged scale to clearly indicate a maximum stress load region.

The residual stress measurement section 104 is a measuring device that measures the residual stress applied to a gear. As the residual stress measurement section 104, an X-ray diffraction device can be used. The residual stress changes by meshing engagement of each gear with a different gear during rotation. FIG. 2A is a view depicting a state in which two gears A and B rotate while meshing with each other. FIG. 2B is a view depicting one tooth 10 configuring the gear B in an enlarged scale to clearly indicate a maximum stress load region. Where the gear A is rotated in a direction D with respect to the gear B, the residual stress is applied to individual regions of the gear B, and of each of the teeth 10 of the gear B, a central region 1 in a tooth length direction 3, which is a tooth face meshing portion with the gear A, and a central region 2 of a tooth root portion, become such maximum stress load regions. If the shape of the tooth 10 is uniform in the thicknesswise direction of the gear, then the residual stress applied to the tooth 10 is uniform in the tooth width direction 4.

The retained γ phase change rate calculation section 105 is a calculation device that calculates the change rate of the content of the retained γ phase (retained γ phase change rate). The residual stress ratio calculation section 106 is a calculation device that calculates a residual stress ratio. The retained γ phase change rate and the residual stress ratio here signify ratios with reference to a state before the gear operates (initial state, new non-damaged commodity state immediately after manufacture, state not used as a gear). In other words, the retained γ phase change rate signifies the (content of the retained γ phase at the time of measurement)/ (content of the retained γ phase before operation). Similarly, the residual stress ratio signifies the (residual stress at the time of measurement)/(residual stress before operation).

The determination section (comparison determination section) 107 is a device that includes determination means for performing, on the basis of results of calculation by the retained γ phase change rate calculation section 105 and the residual stress ratio calculation section 106, determination about whether the state of the gear is a reusable state or a non-usable state.

This determination is performed noticing that the propagation of a crack that occurs in a gear arises from the content of the retained γ phase and the residual stress. FIGS. 3A to 3D are views illustrating a mechanism of propagation of a crack that occurs in a gear.

Figure 3A:
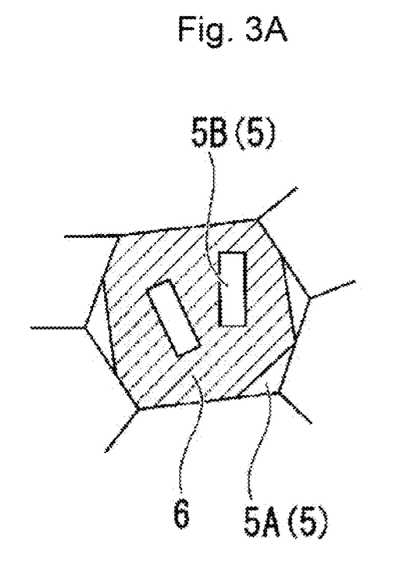
FIG. 3A is a view illustrating a mechanism of propagation of a crack occurring in a gear.
Figure 3B:
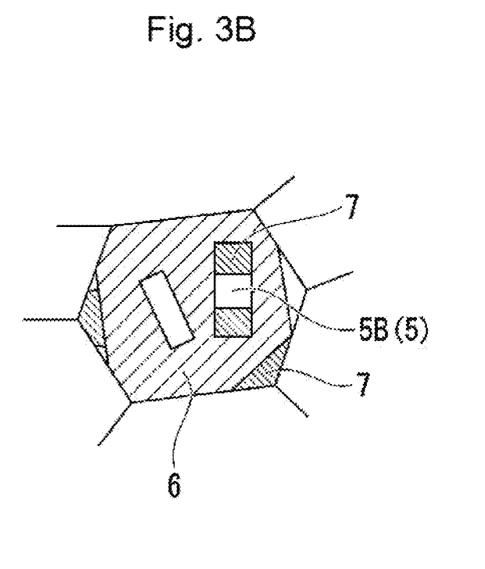
FIG. 3B is a view illustrating the mechanism of propagation of a crack occurring in a gear.

As depicted in FIG. 3A, on the gear A in the initial state, a plurality of retained γ phases 5 and a martensite phase (α' phase) 6 exist. If this gear A is rendered operative, then external load is applied to the gear A. Consequently, in a first phase (first stage) of the operation, a retained γ phase 5A having a comparatively large area or size from among the retained γ phases 5 included in the gear in its initial state is converted into a process-induced martensite phase (αγ' phase, body-centered cubic lattice) having a greater structure (volume). As a result, the content of the retained γ phases 5 as a whole decreases from that in the initial state.

Figure 3C:
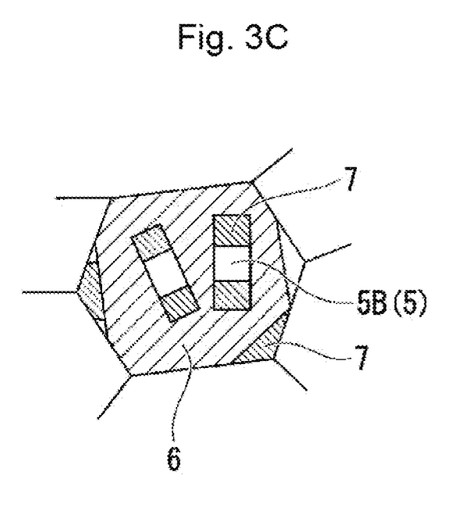
FIG. 3C is a view illustrating the mechanism of propagation of a crack occurring in a gear.

In a subsequent second phase (second stage), part of retained γ phases 5B that have a comparatively small area or size is transformed into a process-induced martensite phase as depicted in FIG. 3C. However, also transformation of the retained γ phases 5A having a comparatively large area or size into a process-induced martensite phase has progressed. As a whole, the content of the retained γ phases 5 has decreased.

Figure 3D:
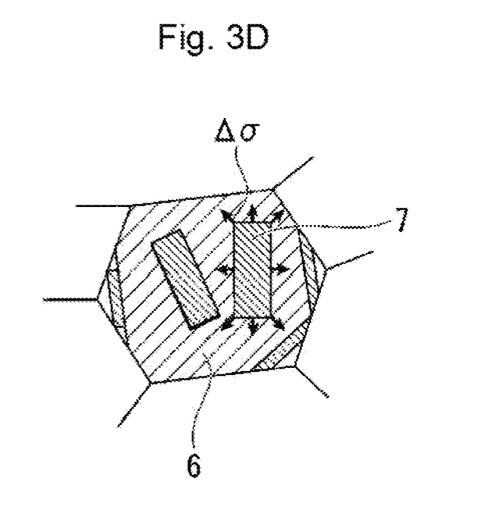
FIG. 3D is a view illustrating the mechanism of propagation of a crack occurring in a gear.

In a third phase (third stage) after this, as depicted in FIG. 3D, almost all of the retained γ phases 5B having a comparatively small area or size transform and as a whole the content of the retained γ phases 5 further decreases in comparison with that in the second phase. Since almost all of the retained γ phases 5 transform into a process-induced martensite phase and volume expansion is constrained, internal stress Δσ is generated thereby. Simultaneously, since a crack occurs and the internal stress is released, the residual stress change rate decreases suddenly.

It is to be noted that the stress intensity factor ΔK, internal stress Δσ, and maximum area Sr of the retained γ phase satisfy a relation represented by the formula (1) given below, and while ΔK is approximately 5.7 MPa·m$^{1/2}$, the lower limit stress intensity factor ΔKth is approximately 5 MPa·m$^{1/2}$. Accordingly, it is considered that the crack is not developed only by the internal stress by transformation. It is to be noted that, in a case where external stress (external load) is applied, since this superposes on the internal stress of the retained γ after the transformation, ΔKth is exceeded readily and the crack develops.

$$\Delta K = \Delta \sigma \sqrt{Sr} \quad (1)$$

Figure 4:
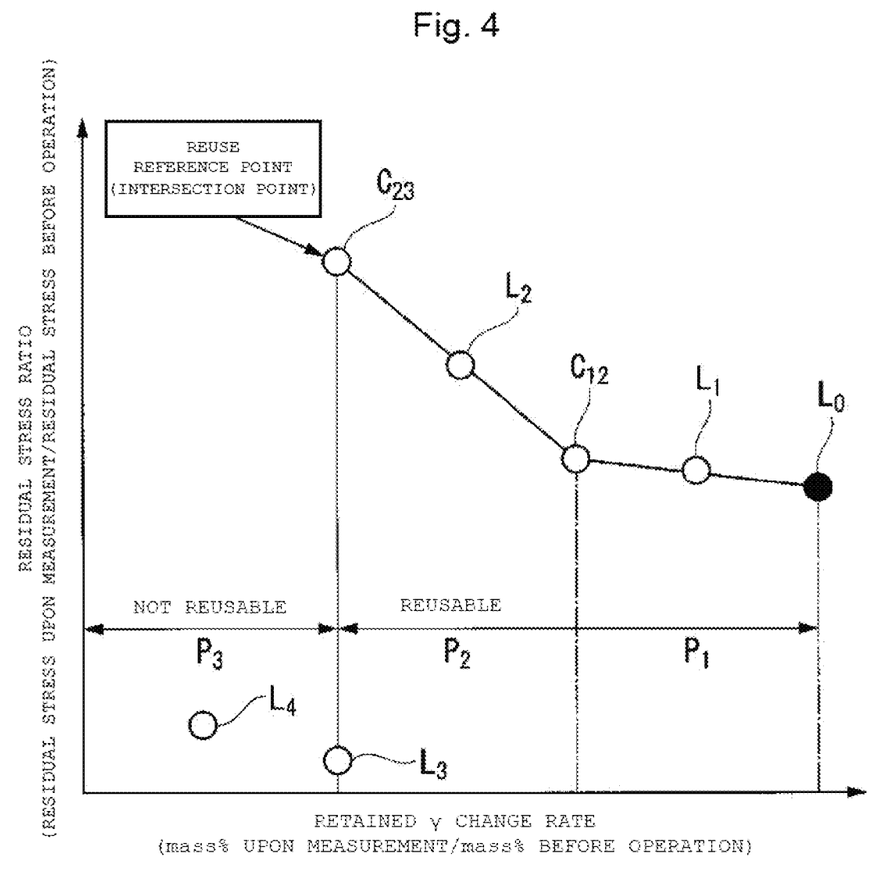
FIG. 4 is a graph depicting a relation between of retained γ phase change rate and residual stress ratio in the embodiment of the present invention.

FIG. 4 is a graph indicating a relation between the content of the retained γ phases and the residual stress in each gear. The axis of abscissa of the graph indicates the retained γ change rate with respect to the content of the retained γ phases in the initial state, and the axis of ordinate of the graph indicates the residual stress ratio with respect to the residual stress in the initial state. A state of a gear defined by the retained γ change rate and the residual stress ratio corresponds to one of three phases (first phase $P_1$, second phase $P_2$, and third phase $P_3$) as plotted on the graph. The plots are lined up in an order of the products ($L_1$, $L_2$, $L_3$, and $L_4$) of the operation time period elapsed after the initial state (operation time period) $L_0$ in which the retained γ change rate is 1 and the total load during the operation.

The first phase $P_1$ is a phase in which the change rate of the residual stress increases as the change rate of the content of the retained γ phase decreases with reference to the state (initial state) at the time of start of use of the gear. In the first phase $P_1$, mainly large retained γ phases of a size equal to or greater than 1 μm² transform into a process-induced martensite phase.

The second phase $P_2$ is a phase in which, after the first phase $P_1$, the change rate of the residual stress increases suddenly from that in the first phase $P_1$ as the change rate of the content of the retained γ phases decreases. In the second phase $P_2$, transformation of almost all of the large retained γ phases end, and external load acts upon the retained γ phases of a size smaller than 0.5 μm².

The third phase $P_3$ is a phase in which, after the second phase $P_2$, the change rate of the residual stress decreases intermittently from that in the second phase $P_2$. The change rate of the residual stress in the third phase $P_3$ sometimes continues to continuously or intermittently decrease as the change rate of the content of the retained γ phases decreases or sometimes keeps a fixed value. In the third phase $P_3$, also the retained γ phases mainly of a size smaller than 0.5 μm² transform into a process-induced martensite phase.

The plots of the first phase $P_1$, second phase $P_2$, and third phase $P_3$ are distributed along distribution straight lines $L_1$, $L_2$, and $L_3$ different from one another, respectively. At the boundary between the first phase $P_1$ and the second phase $P_2$ and the boundary between the second phase $P_2$ and the third phase $P_3$, inflection points $C_{12}$ and $C_{23}$ at which the inclinations of the distribution straight lines change discontinuously exist, respectively. In other words, the deterioration of the gear is different across the inflection point $C_{12}$ and across the inflection point $C_{23}$. The positions of the inflection points $C_{12}$ and $C_{23}$ are determined for each material for the gears.

In the first phase $P_1$ and the second phase $P_2$ before the inflection point $C_{23}$, although the process-induced martensite phase increases in comparison with those in the initial state and the volume expansion is constrained, the gear does not yet suffer from corruption in the inside thereof and occurrence of exfoliation or the like that cannot be confirmed by visual observation. Therefore, the gear is in a reusable state. In contrast, in the third phase $P_3$ after the inflection point $C_{23}$, the gear suffers from corruption in the inside thereof as indicated by release of the internal stress and is not in a state suitable for reuse. Accordingly, the inflection point $C_{23}$ can be used as the reuse reference point for the gears. It can be determined that the gear is reusable if it has a state before the inflection point $C_{23}$, but can be determined that the gear is not reusable if it has a state after the inflection point $C_{23}$.

The reusability determination system 100 for a gear may further include a database 109 that stores known data relating to a correlation between the content of the retained γ phase and the residual stress. In this case, even if data obtained by measurement are only either the retained γ phase or the residual stress, the inflection point $C_{23}$ can be estimated by referring to the database in which the correlation between them is stored, and therefore, reusability can be determined more simply. Further, the reusability determination system 100 for a gear includes a measurement value storage section 107 for storing measurement values of the content of the retained γ phase, residual stress, and so forth. Thus, the retained γ phase change rate calculation section 105 and/or the residual stress ratio calculation section 106 can grasp a time-dependent change in the content of the retained γ phase and/or the residual stress by referring to the content of the retained γ phase and/or the residual stress accumulated in the measurement value storage section. Consequently, it can be determined in which phase or at which inflection point between phases each measurement value is present. Further, the reusability determination system 100 for a gear may include a notification controller 108 and a notification section 110 for the notification of a result of reusability determination.

Figure 5A:
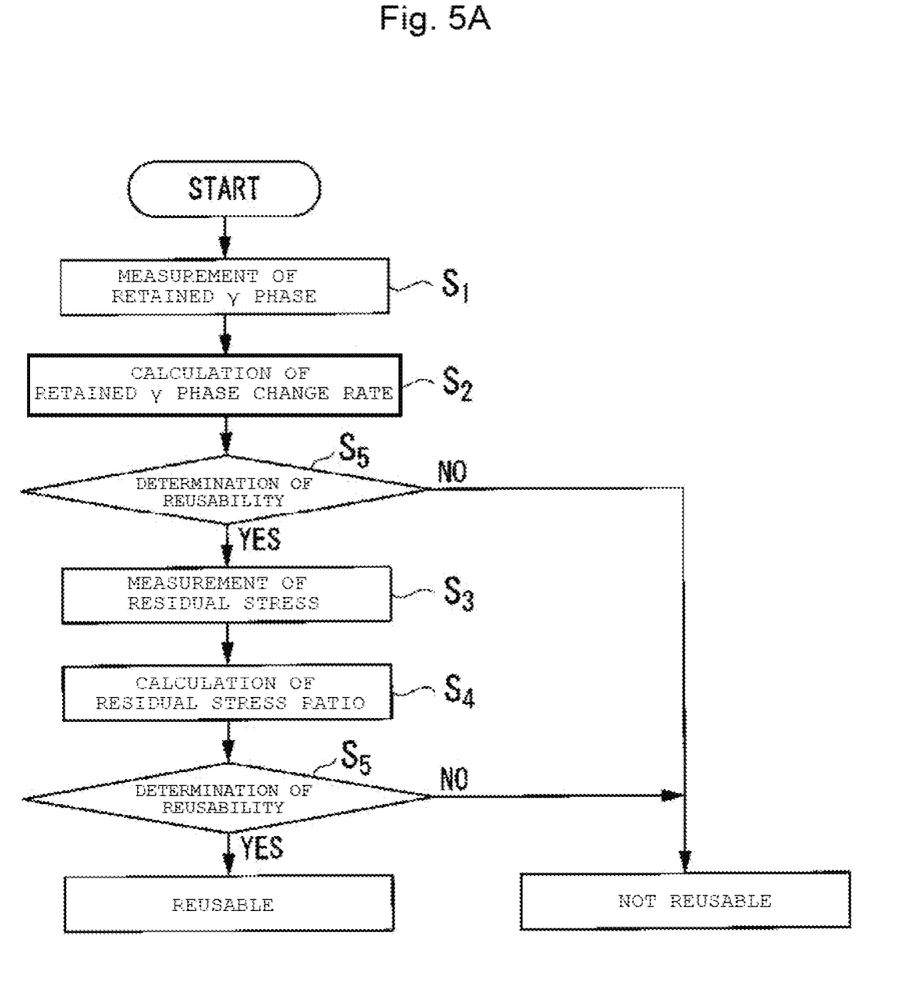
FIG. 5A is a view depicting a flow of steps included in a reusability determination method for a gear according to the embodiment of the present invention.

FIG. 5A is a view depicting a flow of steps included in the reusability determination method for a gear according to the embodiment of the present invention. The reusability determination method for a gear is carried out for a gear during or after use using the reusability determination system for a gear described above. The reusability determination method for a gear mainly includes a retained γ phase measurement step S1, a retained γ phase change rate calculation step S2, a residual stress measurement step S3, a residual stress ratio calculation step S4, and a reusability determination step S5.

In the retained γ phase measurement step S1, the content of the retained γ phases in the maximum stress load region of a gear is measured using an X-ray diffraction method. Then, in the retained γ phase change rate calculation step S2, the change rate of the measured content of the retained γ phases with respect to the content of the retained γ phases in the initial state (before operation of the gear) is calculated. Then, in the reusability determination step S5, it is checked to which one of the first phase $P_1$, second phase $P_2$, and third phase $P_3$ described hereinabove the state of the gear based on a result of the calculation corresponds. In a case where the state of the gear corresponds to the third phase, it is determined that this gear is not reusable. In a case where the state of the gear corresponds to the first phase $P_1$ or the second phase $P_2$, the processing advances to the next residual stress measurement step S3.

In the residual stress measurement step S3, the residual stress in the maximum stress load region of the gear is measured using an X-ray diffraction method. Then, in the residual stress ratio measurement step S4, the change rate of the measured content of the retained γ phases with respect to the content of the retained γ phases in the initial state (before operation of the gear) is calculated. Then, in the reusability determination step S5, it is checked to which one of the first phase $P_1$, second phase $P_2$, and third phase $P_3$ described hereinabove the state of the gear based on a result of the calculation corresponds. In a case where the state of the gear corresponds to the third phase $P_3$, it is determined that this gear is not reusable. In a case where the state of the gear corresponds to the first phase $P_1$ or the second phase $P_2$, it is determined that this gear is reusable.

It is to be noted that the retained γ phase measurement step S1 and retained γ phase change rate calculation step S2, and the residual stress measurement step S3 and residual stress ratio calculation step S4 may be exchanged in the order. Further, the reusability determination step S5 may be performed only once after the retained γ phase change rate calculation step S2 and the residual stress ratio calculation step S4.

Figure 5B:
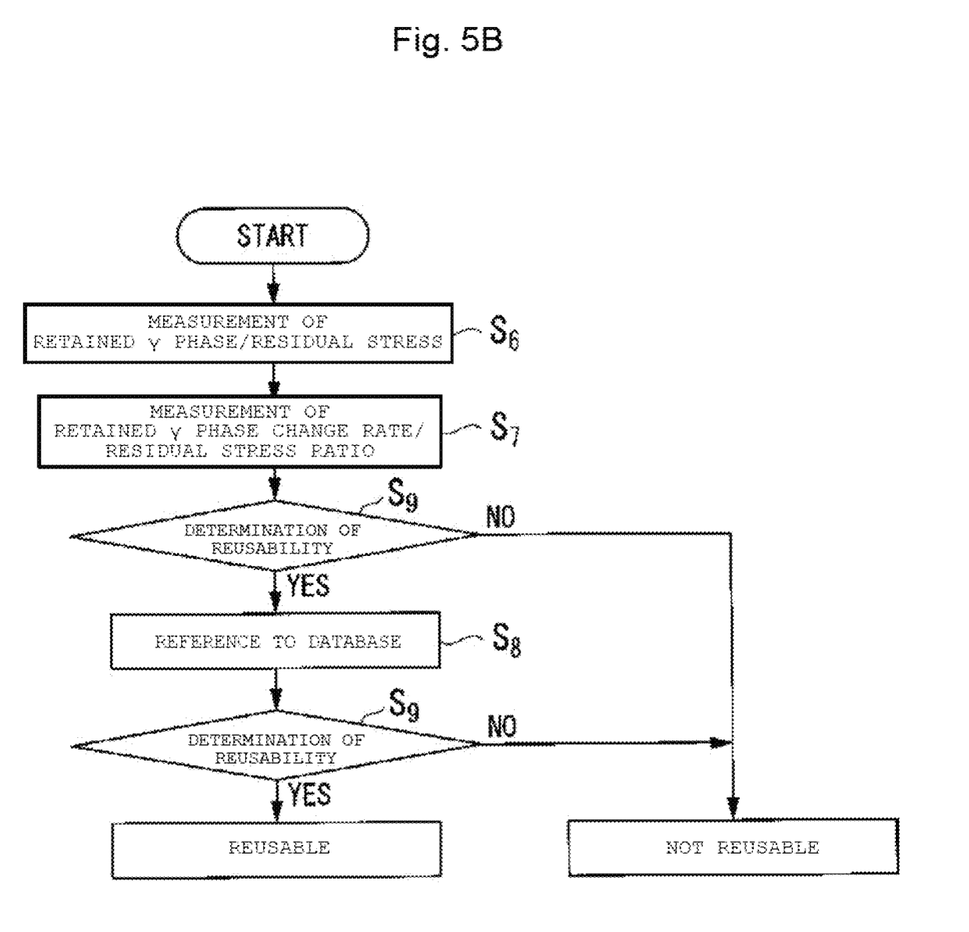
FIG. 5B is a view depicting a flow of steps included in a reusability determination method for a gear according to another embodiment of the present invention.

FIG. 5B is a view depicting a flow of steps included in the reusability determination method for a gear according to another embodiment of the present invention. The reusability determination method for a gear includes, as main steps thereof, a step S6 in which one of the retained γ phase and the residual stress is measured, a step S7 in which one of the retained γ phase change rate and the residual stress ratio is calculated, a database reference step S8, and a reusability determination step S9.

In the step S6 in which one of the retained γ phase and the residual stress is measured, one of the content of the retained γ phases and the residual stress in the maximum stress load region of the gear is measured using an X-ray diffraction method. Then, in the step S7 in which one of the retained γ phase change rate and the residual stress ratio is calculated, the measured change rate of the content of the retained γ phase or the measured residual stress ratio with respect to the content of the retained γ phases or the residual stress in an initial stage (before operation of the gear) is calculated. Then in the reusability determination step S8, it is checked to which one of the first phase $P_1$, second phase $P_2$, and third phase $P_3$ the state of the gear based on a result of the calculation corresponds. In a case where the state of the gear corresponds to the third phase $P_3$, it is determined that this gear is not reusable. In a case where the state of the gear corresponds to the first phase $P_1$ or the second phase $P_2$, the processing advances to the next database reference step S8.

In the database reference step S8, data on either one of or both the retained γ phase and the residual stress are complemented using the database in which data about the correlation between the content of the retained γ phases and the residual stress corresponding to each other are stored. Moreover, in the reusability determination step S9, it is checked to which one of the first phase $P_1$, second phase $P_2$, and third phase $P_3$ described hereinabove the state of the gear based on a result of the calculation corresponds. In a case where the state of the gear corresponds to the third phase $P_3$, it is determined that this gear is not reusable. In a case where the state of the gear corresponds to the first phase $P_1$ or the second phase $P_2$, it is determined that this gear is reusable.

In this manner described above, according to the present embodiment, whether or not a gear is reusable can be determined reasonably from a reference point for reusability determination derived from a correlation between the decrease rate of the retained γ phase and the increase rate of the residual stress. Further, according to the present embodiment, it is possible to implement determination of reusability by non-destructive inspection. As a result, it is possible to simply and objectively perform reusability determination for gear parts including full scrap gear parts for which even visual inspection has not been performed so far. Consequently, it is possible to construct a quality control technology having high reliability, reduce the scrap rate significantly, and reduce the part cost.

EXAMPLE

In the following, the advantageous effects of the present invention are made clearer from the examples. It is to be noted that the present invention is not limited to the following examples and can be carried out in suitably modified forms without departing from the subject matter thereof.

Figure 6A:
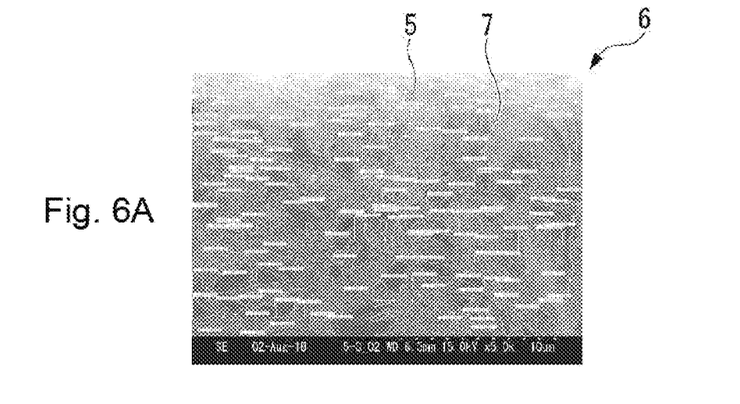
FIG. 6A is a SEM image of a cross section of a gear obtained at a stage before operation.
Figure 6B:
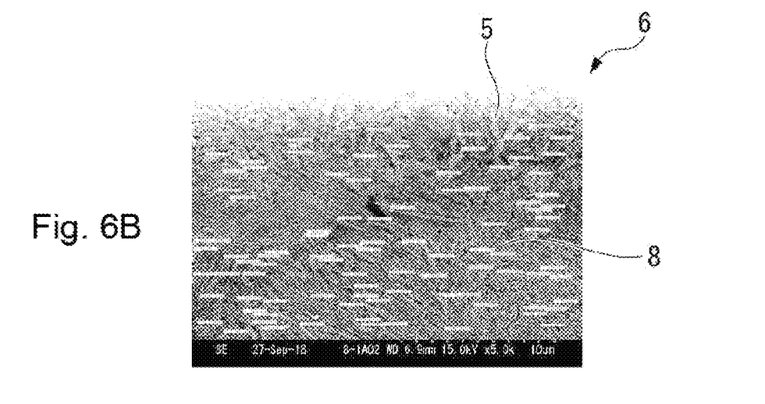
FIG. 6B is a SEM image of a cross section of the gear obtained at a stage after operation.
Figure 6C:
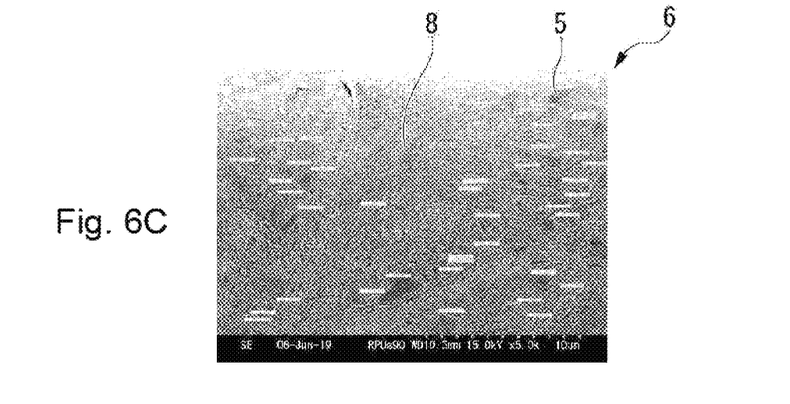
FIG. 6C is a SEM image of a cross section of the gear obtained at another stage after operation.

Electropolishing was performed for a gear before and after operation to expose the retained γ phases on a tooth face of the gear, and the distribution state of the retained γ phases was imaged using a scanning electron microscope (SEM). FIGS. 6A to 6C are SEM images (structure photographs) of a gear before operation, a gear 1 recovered after operation and a gear 2 recovered after operation. The field of view has a depth of approximately 20 μm from the gear surface layer and a width of approximately 25 μm along the gear surface layer. From the SEM images, the presence of martensite phases 6 lined up like a plate can be confirmed. Further, in the martensite phases 6, also carbide 7 can be confirmed as white granules. On the other hand, since the retained γ phases 5 do not contain carbide, they indicate a flat and single contrast.

As depicted in FIG. 6A, many retained γ phases 5 exist before operation, and they have a grain area of approximately 0.005 μm$^2$ where they are small but have a grain area up to 50 μm$^2$ where they are great. This state corresponds to the first phase $P_1$ described hereinabove.

As depicted in FIG. 6B, in the gear 1 recovered after operation, the existence ratio of the retained γ phases 5 has decreased. Especially, such coarse retained γ phases that have a width exceeding 2 μm have been divided. Part of the retained γ phases 5 have transformed into a process-induced martensite phase 8. This state corresponds to the second phase $P_2$ described hereinabove.

As depicted in FIG. 6C, in the gear 2 recovered after operation, the existence ratio of the retained γ phases 5 has decreased further significantly, and fine retained γ phases themselves that can be recognized on the other SEM images have decreased remarkably. Most part of them have been transformed into a process-induced martensite phase 8. This state corresponds to the third phase $P_3$ described hereinabove.

Figure 7:
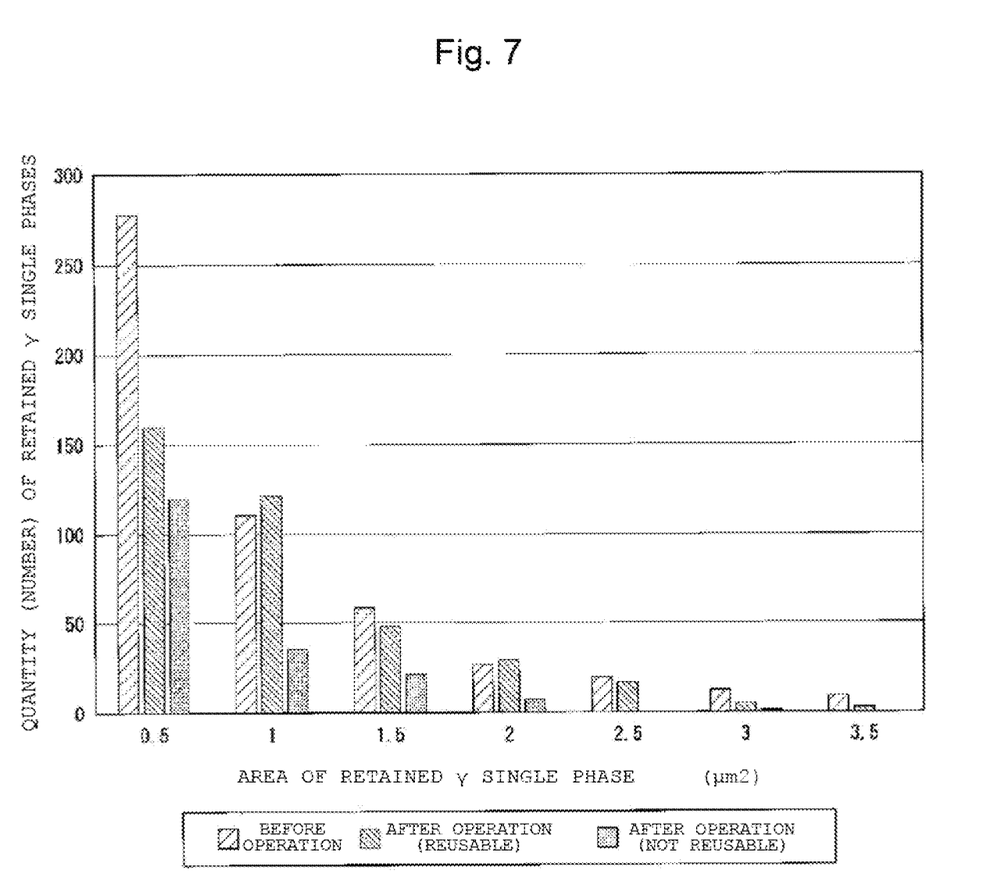
FIG. 7 is a histogram of the grain area of the retained γ phase in several operation states of a gear.

The number of retained γ phases included in a region of 25 μm×20 μm of the SEM images in the FIGS. 6A to 6C was calculated for each grain area. FIG. 7 is a histogram of summarized results of calculation, and the axis of abscissa indicates the grain area (μm$^2$) of the retained γ phase and the axis of ordinate indicates the number of retained γ phases. The retained γ phases before operation are greatest in number where the grain area is equal to or smaller than 0.5 μm$^2$, and the number of such retained γ phases before operation decreases as the grain area increases. Although this tendency similarly applies also to the retained γ phases after operation, especially in the gear 2 recovered after operation, decrease of the retained γ phases of a very small grain area is remarkable.

DESCRIPTION OF REFERENCE CHARACTERS

100: Reusability determination system for gear
101: Measuring apparatus
102: Determination apparatus
103: Retained γ phase measurement section
104: Residual stress measurement section
105: Retained γ phase change rate calculation section
106: Residual stress ratio calculation section
107: Determination section
108: Notification controller
109: Database
110: Notification section
10: Tooth
1: Central region in tooth length direction
2: Central region of tooth root portion
3: Tooth length direction
4: Tooth width direction
5, 5A, 5B: Retained γ phase
6: Martensite phase
8: Process-induced martensite phase
A, B: Gear
$C_{12}$, $C_{23}$: Inflection point
D: Direction of rotation
$P_1$: First phase
$P_2$: Second phase
$P_3$: Third phase

The invention claimed is:

1. A reusability determination method for a gear during or after use, comprising:
 a retained γ phase measurement step of measuring a content of retained γ phases in the gear;
 a retained γ phase change rate calculation step of calculating a change rate of the content of the retained γ phases;
 a residual stress measurement step of measuring residual stress applied to the gear;
 a residual stress ratio calculation step of calculating a residual stress ratio to residual stress in an initial state of the gear; and
 a reusability determination step of determining whether or not the gear is reusable on a basis of results of the calculation in the retained γ phase change rate calculation step and the residual stress ratio calculation step, wherein,
 in the reusability determination step,
 it is determined that the gear is reusable where a state of the gear corresponds to a first phase or a second phase, from among
  the first phase in which a change rate of the residual stress increases as the change rate of the content of the retained γ phases decreases with reference to a state of the gear at time of start of use,
  the second phase in which, after the first phase, the change rate of the residual stress increases steeply from that in the first phase as the change rate of the content of the retained γ phase decreases, and
  a third phase in which, after the second phase, the change rate of the residual stress decreases intermittently with respect to that in the second phase, and
 it is determined that the gear is not reusable where the state of the gear corresponds to the third phase.

2. A reusability determination system for a gear during or after use, comprising:
 a measuring apparatus including a retained γ phase measurement section that measures a content of retained γ phases in the gear and a residual stress measurement section that measures residual stress applied to the gear; and
 a determination apparatus including a retained γ phase change rate calculation section that calculates a change rate of the content of the retained γ phases, a residual stress ratio calculation section that calculates a residual stress ratio to residual stress in an initial state of the gear, and a determination section that determines whether the gear is reusable or is not reusable, wherein the determination section determines, on a basis of results of the calculation in the retained $\gamma$ phase change rate calculation section and the residual stress ratio calculation section, a state of the gear corresponds to which one of a first phase, a second phase, and a third phase, the first phase being a phase in which the change rate of the content of the retained $\gamma$ phases decreases as a change rate of the residual stress increases with reference to a state of the gear at time of start of use, the second phase being a phase in which, after the first phase, the change rate of the residual stress increases steeply from that in the first phase as the change rate of the content of the retained $\gamma$ phase decreases, and the third phase being a phase in which, after the second phase, the change rate of the residual stress decreases intermittently with respect to that in the second phase.

3. The reusability determination system for a gear according to claim 2, wherein the determination apparatus further includes a database in which known data relating to a correlation between the content of the retained $\gamma$ phase and the residual stress are stored.

\* \* \* \* \*